US011577319B2

(12) United States Patent
Benichou et al.

(10) Patent No.: US 11,577,319 B2
(45) Date of Patent: Feb. 14, 2023

(54) TUNGSTEN-CARBIDE/COBALT INK COMPOSITION FOR 3D INKJET PRINTING

(71) Applicant: XJET LTD., Rehovot (IL)

(72) Inventors: Axel Benichou, Givatayim (IL); Liat Laufer, Rehovot (IL)

(73) Assignee: XIET LTD., Rehvot (IL)

( * ) Notice: Subject to any disclaimer, the term of this patent is extended or adjusted under 35 U.S.C. 154(b) by 0 days.

(21) Appl. No.: 17/144,262

(22) Filed: Jan. 8, 2021

(65) Prior Publication Data

US 2021/0370400 A1 Dec. 2, 2021

Related U.S. Application Data

(63) Continuation of application No. 15/029,831, filed as application No. PCT/IB2014/065401 on Oct. 17, 2014, now Pat. No. 10,913,112.

(Continued)

(51) Int. Cl.
*B22F 10/20* (2021.01)
*B33Y 10/00* (2015.01)
(Continued)

(52) U.S. Cl.
CPC .............. *B22F 10/20* (2021.01); *B22F 10/00* (2021.01); *B28B 1/001* (2013.01); *B28B 17/0081* (2013.01); *B29C 64/112* (2017.08); *B29C 64/40* (2017.08); *B33Y 10/00* (2014.12); *B33Y 30/00* (2014.12); *B33Y 40/20* (2020.01); *C09D 11/03* (2013.01); *C09D 11/033* (2013.01); *C09D 11/30* (2013.01); *A43D 2200/60* (2013.01); *B22F 10/10* (2021.01); *B22F 10/30* (2021.01); *B33Y 50/02* (2014.12); *B33Y 70/00* (2014.12); *B33Y 80/00* (2014.12)

(58) Field of Classification Search
CPC ....... C09D 11/03; C09D 11/033; B33Y 70/00; C01G 41/00; C01G 51/00
See application file for complete search history.

(56) References Cited

U.S. PATENT DOCUMENTS 3,451,791 A 6/1969 Meadows et al.
4,364,059 A 12/1982 Nagayama
(Continued)

FOREIGN PATENT DOCUMENTS

DE 4324647 1/1994
EP 1 918 026 5/2008
(Continued)

OTHER PUBLICATIONS

Ahn B. Y. et al. "Printed Origami Structures"—Published online: Apr. 15, 2010 (4 pages).
(Continued)

*Primary Examiner* — Michael M. Robinson
(74) *Attorney, Agent, or Firm* — Finnegan, Henderson, Farabow, Garrett & Dunner LLP

(57) ABSTRACT

There is disclosed an ink composition for three dimensional (3D) printing. The ink composition comprises: a liquid dispersion of tungsten carbide (WC) particles and cobalt (Co) particles, and, a carrier vehicle for the dispersion of tungsten carbide particles and the dispersion of cobalt particles. The ink composition is of a viscosity usable with ink jet print heads for 3D printing.

17 Claims, 3 Drawing Sheets

Related U.S. Application Data

(60) Provisional application No. 61/891,926, filed on Oct. 17, 2013.

(51) Int. Cl.

| | | |
|---|---|---|
| B33Y 30/00 | (2015.01) | |
| C09D 11/30 | (2014.01) | |
| B29C 64/112 | (2017.01) | |
| B29C 64/40 | (2017.01) | |
| B22F 10/00 | (2021.01) | |
| B28B 1/00 | (2006.01) | |
| C09D 11/03 | (2014.01) | |
| C09D 11/033 | (2014.01) | |
| B28B 17/00 | (2006.01) | |
| B22F 10/30 | (2021.01) | |
| B22F 10/10 | (2021.01) | |
| B33Y 70/00 | (2020.01) | |
| B33Y 80/00 | (2015.01) | |
| B33Y 40/00 | (2020.01) | |
| B33Y 50/02 | (2015.01) | |
| B33Y 40/20 | (2020.01) | |

(56) References Cited

U.S. PATENT DOCUMENTS

| | | | |
|---|---|---|---|
| 4,847,636 | A | 7/1989 | Durbeck et al. |
| 5,136,515 | A | 8/1992 | Helinski |
| 5,151,377 | A | 9/1992 | Hanoka et al. |
| 5,640,183 | A | 6/1997 | Hackleman |
| 6,203,136 | B1 | 3/2001 | Takahashi et al. |
| 6,291,123 | B1 | 9/2001 | Ohno et al. |
| 6,305,769 | B1 | 10/2001 | Thayer et al. |
| 6,328,418 | B1 | 12/2001 | Yamada et al. |
| 6,471,352 | B2 | 10/2002 | Akahira |
| 6,514,343 | B1 | 2/2003 | Motoda |
| 6,531,191 | B1 | 3/2003 | Notenboom |
| 6,536,853 | B2 | 3/2003 | Egle et al. |
| 6,596,224 | B1 | 7/2003 | Sachs et al. |
| 6,824,245 | B2 | 11/2004 | Silverbrook et al. |
| 7,037,448 | B2 | 5/2006 | Nagai et al. |
| 7,222,930 | B2 | 5/2007 | Niimi |
| 7,393,073 | B2 | 7/2008 | Zach |
| 7,479,297 | B2 | 1/2009 | Miura |
| 7,494,607 | B2 | 2/2009 | Wang et al. |
| 7,502,023 | B2 | 3/2009 | Zinniel et al. |
| 7,506,960 | B2 | 3/2009 | Chikanawa et al. |
| 7,513,595 | B2 | 4/2009 | Nakamura |
| 7,604,320 | B2 | 10/2009 | Robertson et al. |
| 7,717,540 | B1 | 5/2010 | King et al. |
| 7,718,092 | B2 | 5/2010 | Rose et al. |
| 7,919,538 | B2 | 4/2011 | Vo et al. |
| 7,963,634 | B2 | 6/2011 | Yokouchi |
| 8,319,808 | B2 | 11/2012 | Sadowara et al. |
| 9,004,667 | B2 | 4/2015 | Taguchi |
| 2002/0011693 | A1 | 1/2002 | Leyden et al. |
| 2002/0015855 | A1 | 2/2002 | Sajoto et al. |
| 2002/0195747 | A1* | 12/2002 | Hull .................. B29C 64/124 425/375 |
| 2004/0041892 | A1 | 3/2004 | Yoneyama et al. |
| 2004/0115339 | A1 | 6/2004 | Ito |
| 2004/0145858 | A1 | 7/2004 | Sakurada |
| 2004/0151978 | A1 | 8/2004 | Huang |
| 2004/0246294 | A1 | 12/2004 | Mitsuzawa |
| 2005/0104241 | A1 | 5/2005 | Kritchman et al. |
| 2005/0151792 | A1 | 7/2005 | Niimi |
| 2005/0253879 | A1 | 11/2005 | Yamanobe |
| 2006/0044331 | A1 | 3/2006 | Tsutsumi et al. |
| 2006/0045962 | A1 | 3/2006 | Miura |
| 2006/0132571 | A1 | 6/2006 | Baker et al. |
| 2007/0063366 | A1 | 3/2007 | Cunningham et al. |
| 2007/0107773 | A1 | 5/2007 | Fork et al. |
| 2007/0153035 | A1 | 7/2007 | Jung et al. |
| 2007/0211105 | A1 | 9/2007 | Furukawa |
| 2008/0024557 | A1 | 1/2008 | Moyhihan |
| 2008/0158278 | A1 | 7/2008 | Inoue |
| 2008/0314276 | A1 | 12/2008 | Gothait et al. |
| 2009/0145479 | A1 | 6/2009 | Williams |
| 2009/0244153 | A1 | 10/2009 | Miyamoto |
| 2009/0321123 | A1 | 12/2009 | Lochtman et al. |
| 2010/0040767 | A1 | 2/2010 | Uibel et al. |
| 2010/0061925 | A1 | 3/2010 | Lee et al. |
| 2011/0151665 | A1 | 6/2011 | Gothati et al. |
| 2011/0227988 | A1 | 9/2011 | Yamazaki |
| 2011/0279544 | A1 | 11/2011 | Dovrat et al. |
| 2011/0292153 | A1 | 12/2011 | Sadowara et al. |
| 2012/0015152 | A1 | 1/2012 | Takahashi et al. |
| 2012/0033002 | A1 | 2/2012 | Seeler et al. |
| 2012/0062640 | A1 | 3/2012 | Uraki et al. |
| 2012/0081455 | A1 | 4/2012 | Kritchman et al. |
| 2012/0111409 | A1 | 5/2012 | Kim et al. |
| 2012/0308837 | A1 | 12/2012 | Schlechtriemen et al. |
| 2013/0141491 | A1 | 6/2013 | Krichtman et al. |
| 2013/0176355 | A1 | 7/2013 | Kritchman et al. |
| 2013/0208048 | A1 | 8/2013 | Kritchman et al. |
| 2013/0309607 | A1* | 11/2013 | Katayama ............... C08L 79/04 430/283.1 |
| 2014/0360762 | A1 | 12/2014 | Lee |
| 2015/0255632 | A1 | 9/2015 | Kritchman et al. |
| 2015/0298394 | A1 | 10/2015 | Sheinman |
| 2015/0353804 | A1* | 12/2015 | Ghosal ..................... C09C 3/08 252/75 |
| 2016/0039207 | A1 | 2/2016 | Kritchman et al. |
| 2016/0121432 | A1* | 5/2016 | Watanabe ............ B23K 35/365 148/24 |
| 2016/0229128 | A1 | 8/2016 | Dayagi et al. |
| 2016/0236372 | A1 | 8/2016 | Benichou et al. |
| 2016/0243619 | A1 | 8/2016 | Gothait et al. |
| 2019/0322031 | A1* | 10/2019 | Kritchman ............ B29C 64/10 |

FOREIGN PATENT DOCUMENTS

| | | |
|---|---|---|
| EP | 2028240 | 2/2009 |
| EP | 2083052 | 7/2009 |
| EP | 2390406 | 11/2011 |
| EP | 3058037 B1 | 7/2020 |
| JP | 03-184852 | 8/1991 |
| JP | 03/262646 | 11/1991 |
| JP | 04-235054 | 8/1992 |
| JP | H09-193404 | 7/1997 |
| JP | 10/140209 | 5/1998 |
| JP | 11-342598 | 12/1999 |
| JP | H11-342598 | 12/1999 |
| JP | 2001/341319 | 12/2001 |
| JP | 2003-133692 | 5/2003 |
| JP | 2004/042551 | 2/2004 |
| JP | 2007-152161 | 6/2006 |
| JP | 2007-061784 | 3/2007 |
| JP | 2008-124413 | 5/2008 |
| JP | 2008/201102 | 9/2008 |
| JP | 2009/034830 | 2/2009 |
| JP | 2009/226717 | 10/2009 |
| JP | 2010-069856 | 4/2010 |
| JP | 2011/042830 | 3/2011 |
| JP | 2011/116141 | 6/2011 |
| JP | 2011-016301 | 7/2011 |
| KR | 10-2003-0091006 | 8/2005 |
| WO | WO 2006/081310 | 8/2006 |
| WO | WO 2007/079424 | 7/2007 |
| WO | WO 2008/084972 | 7/2008 |
| WO | WO 2009/017648 | 2/2009 |
| WO | WO 2012/078820 | 6/2012 |
| WO | WO 2014/068579 | 5/2014 |

OTHER PUBLICATIONS

Cappi B. et al. "Direct inkjet printing of Si3N4: Characterization of ink, green bodies and microstructure", 2008, Journal of the European Ceramic Society, vol. 28 pp. 2625-2628 (published on line:Apr. 28, 2008).

(56) References Cited

OTHER PUBLICATIONS

English Abstract for JP 46/029484, published Aug. 27, 1971.
Hong E. et al. "Microstructure and Mechanical Properties of Reticulated Titanium Scrolls"—Published online: Aug. 29, 2011 (6 pages).
International Search Report dated Feb. 17, 2015 in International Application No. PCT/IB2014/065400 (6 pages).
International Search Report dated Feb. 19, 2016 in International Application No. PCT/IL2013050453 (7 pages).
International Search Report dated Jan. 11, 2015 in International Application No. PCT/IB2014/065401 (6 pages).
International Search Report dated Oct. 17, 2014 in International Application No. PCT/IB2014/065402 (7 pages).
Kernan et al. "Three-dimensional printing of tungsten carbide—10 wt% cobalt using a cobalt oxide precursor"—Published online: Jan. 31, 2007.
Mott M. et al. "Microengineering of Ceramics by Direct Ink-Jet Printing", 1999, J. Am. Ceram. Soc., vol. 82, No. 7, pp. 1653-1658 (Jul. 31, 1999) DOI: 10.1111/j.1151-2916.1999.tb0.
Ozkol E. et al. "Development of high solid content aqueous 3Y-TZP suspensions for direct inkjet printing using a thermal inkjet printer", 2009, Journal of the European Ceramic Society, vol. 29, pp. 403-409 (published on line: Aug. 13, 2008).
Second Office Action from the Chinese Patent Office for 20149—57373.0 dated Mar. 2, 2018. (6 pages + 5 page translation).
Song H. J. et al. "Formulation and Multilayer jet Printing of Ceramic inks", 1999, J. Am. 1-3,13-17,27,28 Ceram. Soc., vol. 82, No. 12, pp. 3374-3380 (Dec. 31, 1999).
TriTrust Industrial, "Preparation of superfine TiH2 powder with high energy ball milling"—Published online: Oct. 9, 2014 (2 pages).
Notice of Reexamination from Chinese Patent Office for CN Patent App. No. 201480057373.0 dated Mar. 29, 2022. (8 pages + 8 page translation).
Bin Hongzan, "Advanced Manufacturing Technology," Huazhong University of Science and Technology (HUST) Press, p. 173 (Oct. 2010).
Notice of Reexamination from Chinese Patent Office for CN Patent App. No. 201480057373.0 dated Aug. 23, 2022. (12 pages + 10 page translation).
Zhu Hongmin, "Metallurgical Research," Metallurgical Industry Press, No. 1, pp. 263-265 (Apr. 2006).
Yang Xuewen, "Chemical Building Materials," Chongqing University Press, $1^{st}$ Edition, pp. 76-77 (Aug. 2006).
Li Zhaoqiang, "The Production and Application of Modern Coatings," Shanghai Science and Technology Literature Publishing House, $1_{st}$ Edition, pp. 187-188 (Feb. 1996).

* cited by examiner

TUNGSTEN-CARBIDE/COBALT INK COMPOSITION FOR 3D INKJET PRINTING

CROSS REFERENCES TO RELATED APPLICATIONS

This application is a continuation U.S. application Ser. No. 15/029,831, filed Apr. 15, 2016, which is a national stage application of PCT/IB2014/065401, filed Oct. 17, 2014, which claims the benefit of U.S. Patent Provisional Application No. 61/891,926, filed Oct. 17, 2013, all of which are incorporated by reference in their entirety herein.

This application is also related to commonly owned U.S. Patent Applications, 1) entitled: Methods and Systems for Printing 3D Object by Inkjet, U.S. application Ser. No. 15/029,815, and, 2) entitled: Support Ink For Three Dimensional (3D) Printing, U.S. application Ser. No. 15/029,854, both of the aforementioned U.S. Patent Applications filed on the same day as this application, and the disclosures of which are incorporated by reference in their entirety herein.

TECHNICAL FIELD

The present invention generally relates to inks for ink jet print heads and in particular to inks for 3D (three-dimensional) printing.

BACKGROUND OF THE INVENTION

The 3D (three-dimensional) printing market is maturing rapidly. 3D printing or additive manufacturing (AM) is any of various processes for making a 3D object of almost any shape from a 3D computer model or other electronic data source primarily through additive processes in which successive layers of material are laid down under computer control. A 3D printer is a type of industrial robot, which utilize printing technologies for fabricating the required object.

Conventional 3D processes include stereo lithography employing UV lasers to cure photopolymers, inkjet printers utilizing UV radiation to polymerize photomonomers and oligomers, metal sintering (such as selective laser sintering and direct metal laser sintering), fused deposition modeling (FDM, based on extrusion technology), and deposition of liquid binders onto powders.

3D printing is used in applications such as product development, data visualization, rapid prototyping, specialized manufacturing, and production (job production, mass production, and distributed manufacturing). Such 3D printing technologies are used in many fields, such architecture, construction (AEC), industrial design, automotive, aerospace, military, engineering, dental and medical industries, biotech (human tissue replacement), fashion, footwear, jewelry, eyewear, education, geographic information systems, food, and many other fields.

Massachusetts Institute of Technology provided many early developments in three dimensional printing (3DP). These three dimensional printing processes are often compared with inkjet process. However, in a 3D printing process, instead of an ink, a polymer "glue" is deposited on a metallic powder layer. When "printing" of the three dimensional object has finished, the powder free of glue is then removed by vacuum, followed by additional cleaning including brushing.

Solid-Freeform Fabrication (SFF)—also known as Rapid Prototyping (RP) of WC-9 wt % (weight percent) Co has been previously explored by selective laser sintering of both mixed and mechanically alloyed less than 25 to 50 microns WC and 2-4 microns Co powders to form thick 2-D layers, but not 3 dimensional parts. In metal cutting applications, small (1 micron) WC grains are needed for adequate toughness; while in wear applications, larger WC grains are tolerable.

Slurry-based Three Dimensional Printing (3DP) is another SFF technique. A ceramic powder bed is formed by jetting a slurry through a small diameter nozzle which is raster-scanned over a porous substrate, forming a thin slip cast layer of material. After drying, a binder material is ink-jet printed into the powder bed to form the layer geometry; followed by a second drying step. This process is repeated, building each layer on top of the previous one, until the part is completed. Large amounts of binder must be printed to form the layer geometry, and to penetrate through the thickness of the top slip cast layer to the layer below and knit the layers together. The regions of unprinted material serve as support for the printed regions, enabling formation of complex geometries, such as internal cavities, passages or negative draft angles. In that process, large amount of metallic powder used a support could not be completely recycled for further printing. After printing is complete, the binder is cured and the parts are then retrieved from the powder bed m a highly costly process called redispersion.

SUMMARY

Embodiments of the invention are directed to inks for 3D printing from ink jet print heads designed for 3D printing.

Embodiments of the present invention are directed to materials and compositions utilized for 3D printing objects which are comprised of tungsten carbide and cobalt in a liquid carrier. The 3D printed objects are then subjected to heat treatments to obtain the final product.

Embodiments of the present invention provide inks for 3D printing. These inks comprise a liquid vehicle, which serves as a carrier, Tungsten Carbide (WC) and Cobalt (Co) as submicron particles, nanoparticles. Cobalt could also be present in the ink in the form of precursors, such as soluble organo cobalt compounds, salts or complexes. Embodiments of the invention also provide inks for 3D printing, which also include additives, depending on the resultant desired physical properties of the inks and the resulting object after the post-printing treatment, for example, a heat treatment. These additives include, for example, wetting agents, dispersing agents, binders, rheological agent, leveling agents. The additives may also include a binder material, including organic binders, which provide the printed object with the mechanical strength necessary for maintaining its shape, one printed and formed as a "green part" or a "green body," prior to any post printing processes, such as heat treatments.

Throughout this document, "green bodies" and "green parts" are used interchangeably to describe articles of parts printed with the disclosed inks by the disclosed 3D printing techniques, but prior to any post processing treatments, typically heat treatments, such as sintering.

As used herein, "sintering" is a process used to merge individual particles into a continuous bulk structure. Sintering involves is the heating and/or pressurizing particles in a material, without melting them to the point of liquefaction, to form a solid mass of the material. During sintering, the atoms in the particles diffuse across the boundaries of the particles, fusing the particles together and creating one solid piece. Because the sintering temperature does not have to reach the melting point of the material, sintering is often chosen as the shaping process for materials with extremely high melting points such as tungsten (W). The required sintering temperature substantially depends on the type and size of the particles and the melting point of the particles material.

Embodiments of the invention are directed to processes for post treatments of the printed parts, while they are "green parts." These post-printing processes are typically heat treatments, including those for sintering the particles or "green bodies" of the "green parts." The sintering results in an object with sintered, or unified WC and Co particles, with enhanced mechanical properties, when compared to the object upon printing. The sintered objects are useful, for example, as cutting tools.

After printing, the green part undergoes a sintering process, consisting of heating under vacuum and low temperature (few hundred degrees Celsius) where the organic material is removed (de-binding phase), followed by liquid phase sintering at temperatures close to the melting point of Co. After sintering, the WC/Co objects have the required mechanical strength and hardness to be used, for example, as cutting tools.

Other embodiments of the present invention may use additional inks for localized deposition of specific materials, for example, by adding it into the print head or by using an additional print head, to add the ink to the printed article, at certain times during printing. Embodiments of the invention are directed to 3D printing with inks formed of micron and submicron powders, so as to produce metal cutting inserts (milling, turning, etc.). Embodiments of the present invention provide inks, used to produce the desired 3D printed object. These disclosed inks are also useful with support inks, which are typically used at certain times during printing, but may be used through the entire 3D printing process. The support inks are used, for example to support "negative" tilted walls of the object.

Throughout this document, the term "dispersion" generally refers to particles distributed and suspended in a liquid.

Embodiments of the invention are directed to an ink composition. The ink composition comprises: (a) a liquid dispersion of tungsten carbide (WC) particles and cobalt (Co) particles, wherein the weight ratio of tungsten carbide particles to cobalt particles is approximately (or about) 8:2 to approximately (or about) 9.5:0.5; and, (b) a carrier vehicle for the dispersion of tungsten carbide particles and the dispersion of cobalt particles, wherein the composition is of a viscosity between approximately (or about) 10 cPs to approximately 30 cPs.

Optionally, the liquid dispersion includes one liquid dispersion of tungsten carbide particles and one liquid dispersion of cobalt particles.

Optionally, the weight ratio of tungsten carbide particles to cobalt particles 1s approximately 9:1.

Optionally, the tungsten carbide particles are of diameter sizes less than 2 micrometers.

Optionally, the cobalt particles are of diameter sizes less than 2 micrometers. Optionally, the cobalt particles are of diameter sizes less than 50 nanometers.

Optionally, the cobalt particles are of diameter sizes to inhibit magnetic attractions with other cobalt particles.

Optionally, the cobalt particles are of diameter sizes less than 20 nanometers.

Optionally, the tungsten carbide and cobalt particles are approximately 40 to approximately 60 weight percent of the ink composition.

Optionally, the carrier vehicle is approximately 40 to approximately 60 weight percent of the ink composition.

Another embodiment is directed to a method for printing a three dimensional object. The method comprises, for example, the steps or processes of: printing, with an ink jet print head, a three dimensional object from an ink composition comprising: (a) a liquid dispersion of tungsten carbide particles and cobalt particles, wherein the weight ratio of tungsten carbide particles to cobalt particles is approximately 8:2 to approximately 9.5:0.5; and, (b) a carrier vehicle for the dispersion of tungsten carbide particles and the dispersion of cobalt particles, wherein the composition is of a viscosity between approximately 10 cPs to approximately 30 cPs; and, heat treating the printed object.

Optionally, the heat treating includes melting the Co particles and sintering the WC particles.

Optionally, the object includes a cutting tool.

Optionally, the liquid dispersion includes one liquid dispersion of tungsten carbide particles and one liquid dispersion of cobalt particles.

Optionally, the weight ratio of tungsten carbide particles to cobalt particles 1s approximately 9:1.

Optionally, the tungsten carbide particles are of diameter sizes less than 2 micrometers.

Optionally, the cobalt particles are of diameter sizes less than 2 micrometers.

Optionally, the cobalt particles are of diameter sizes less than 50 nanometers.

Optionally, the cobalt particles are of diameter sizes to inhibit magnetic attractions with other cobalt particles.

Optionally, the cobalt particles are of diameter sizes less than 20 nanometers.

Optionally, the tungsten carbide and cobalt particles are approximately 40 to approximately 60 weight percent of the ink composition.

Optionally, the carrier vehicle is approximately 40 to approximately 60 weight percent of the ink composition.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1A:
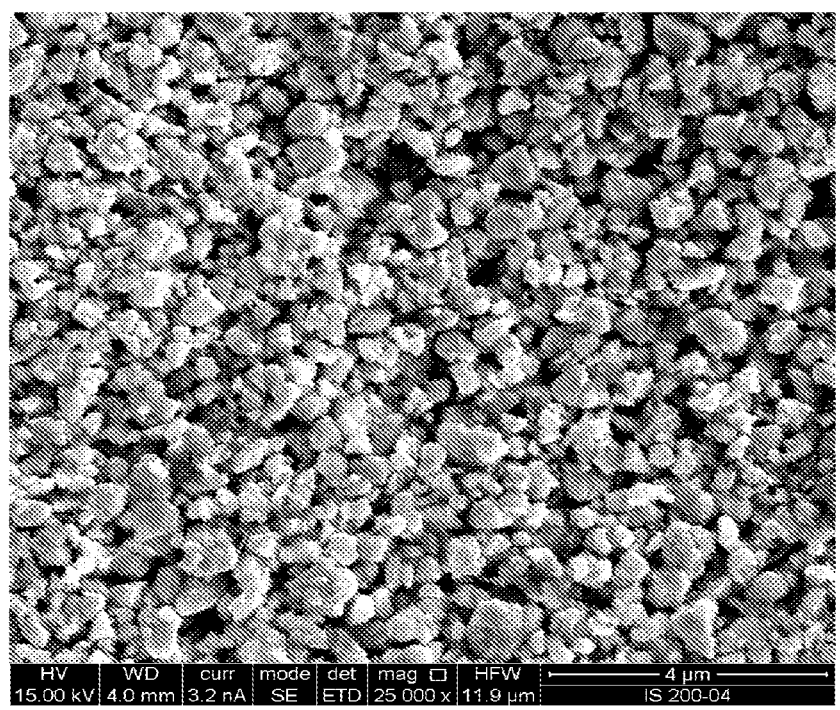
FIG. 1A is a photomicrograph of an exemplary dispersion of tungsten carbide (WC) particles in an ink in accordance with an embodiment of the present invention.

Described herein are stable liquid formulations useful as inks for 3D Printing machines and processes of printing using the disclosed inks. These inks include Tungsten Carbide (WC) particles and Cobalt (Co) particles in a liquid carrier, with additional additives, either alone, or in any combination, also being part of the ink. Such additives may include, for example, dispersing agents, wetting and leveling agents, rheological agents and binders. The ink compositions are of viscosities between approximately 10 cPs (centi poise) to approximately 30 cPs, and typically 15±5 cPs, at jetting temperature, so as to be suitable for use as inkjet printing inks.

The inks of the present invention allow for the rapid fabrication, typically in small batches, of prototype parts for design iterations, testing or small-scale production runs.

The embodiments of the invention disclosed herein utilize Tungsten Carbide (WC) particles and Cobalt (Co) particles in liquid dispersion to form inks, which are used in 3D printing operations. These inks have long term stability as the particles are prevented from exposure to atmospheric oxygen and other contaminants.

Particles

The particles for the inks include particles of Tungsten Carbide (WC) and Cobalt (Co). These particles are, for example, spherical, but may be of another shape, including rounded, partially rounded, polygonal, rectangular and the like. The particles may be crystalline or amorphous, or combinations thereof. Throughout this document, when particle sizes are listed, the sizes are diameters, except where specifically indicated.

The WC particles are, for example, spherical or substantially spherical or rounded, and are of diameters of approximately less than 2 micrometers, and, for example, approximately 1 micrometer or less. The particles may be obtained by physical methods such grinding bulk material, such as WC powder, available from General Carbide Corporation, Greensburg, Pa., USA. WC powder can also be prepared by reaction of tungsten (W) metal and carbon (Carbon black) at 1450-1500° C.

The Co particles are, for example, spherical or substantially spherical or rounded, and are of diameters of approximately less than 2 micrometers, and, for example, approximately 1 micrometer or less. In alternative embodiments, the Co particles may be approximately 50 nanometers or less. In alternative embodiments, the Co particles may be approximately 20 nanometers or less. The particles may be obtained by physical methods such grinding bulk material, such as Co powder, available from Global Tungsten & Powder (GTP), Towanda, Pa., USA. Co nanoparticles dispersion, of sizes ranging from 5 to 50 nm may also be obtained from the reduction of cobalt acetate in polyol as described in: Surface investigation and magnetic behavior of Co nanoparticles prepared via a surfactant-mediated polyol process, J. Phys. Chem., 113, 5081-508, 2009. The chemical reduction may be performed for example by reducing Co acetate tetrahydrate in polyol/oleic acid mixture under Argon atmosphere. The WC particles and Co particles are initially in separate dispersions.

These particle sizes for WC and Co allow for compatibility with ink jet print heads such as a Diamatics Sapphire QS-256 print head from Konica Minolta, and useful in 3D printing processes, such as those disclosed herein.

The WC particle dispersion is formed of WC powder (detailed above) dispersed in a liquid carrier vehicle, i.e., glycol ether, that contain a dispersing agent that will adsorb on the WC particles during milling processes. An example WC dispersion includes 55±2 wt % WC powder (0.8 micron) in glycol ethers, approximately 45 wt %, and stabilized with a polymeric dispersant of up to approximately 5 wt % on WC particles).

The Co dispersion is formed of cobalt powder (detailed above) dispersed in a liquid carrier vehicle, i.e., glycol ether that contains dispersing agent that will adsorb on the Co particles during milling processes. An example Co dispersion includes dispersing approximately 60 wt % Co powder of a diameter of approximately 70 nm, in glycol ethers, at approximately 40 wt % and stabilized with a polymeric dispersant of up to approximately 5 wt % on WC particles. For example, and in accordance with some embodiments, wetting and leveling agents may be added to the Co dispersion to adjust specific properties of the ink, such as viscosity, surface tension, drying behavior.

The overall weight percent of the WC/Co powders is approximately 40 to approximately 60 weight percent of the ink (ink composition).

Alternately, there may be a cobalt precursor (organo cobalt compound) solution instead of or with the Co dispersion. In this case, cobalt precursor dissolved in the ink liquid carrier, will revert to metallic Co during post printing process. Organo cobalt compounds could be taken from the following non limiting list: Dicobalt octacarbonyl, Cyclopentadienylcobalt dicarbonyl, Dicarbonylcyclopentadienyl cobalt, Pentamethylcyclopentadienyl cobalt(I) dicarbonyl, Cobalt tetracarbonyl (Sigma, USA). Since these molecules will be incorporated in a dissolved manner in the ink carrier, no dispersant is required in most cases. In some examples, a low molecular surfactant may be added to the organo cobalt compound solution to control the size the new formed Co nanoparticles and to enhance its solubility. Possible surfactants could be: lauryl acid, oleic acid, lauryl amine, oleylamine at a concentration of 5-10 wt % based on Co content.

The WC and Co dispersions are such that the respective metal particles themselves, are, for example, in a mixture of approximately 89±10 weight percent WC metal particles, and 11±10 weight percent Co metal particles, or at an approximately 9:1 WC to Co metal particle weight ratio. While, this weight ratio of 9:1 is preferred, the weight ratio of WC metal particles (the first number in the ratio) to Co metal particles (the second number in the ratio) may range from approximately 8:2 to approximately 9.5:0.5. This mixture is then mixed with the desired additives to form the final ink at a controlled WC/Co weight ratio to reach the correct mechanical behavior of the 3D printed article (object).

Alternatively, the WC and Co particles are obtained in a single dispersion. Typical mixture dispersions range from approximately weight ratios of WC particles to Co particles of approximately 80:20 to approximately 95:5 respectively. Single dispersion is usually formed of 90 wt % (weight percent) WC particles and 10 wt % (weight percent) Co particles, in a carrier vehicle, such as glycol ethers and their mixtures, as detailed below. In some dispersions, a certain amount of smaller particles, e.g., 20 nm size Co particles may be added. A Co nanoparticles dispersion is prepared by chemical reduction in an organic liquid under Argon atmosphere as described in one of the following procedures:

1. Surface investigation and magnetic behavior of Co nanoparticles prepared via a surfactant-mediated polyol process, *J. Phys. Chem. C.*, 113,5081-508, 2009
2. Size and structure control of magnetic nanoparticles by using a modified polyol process, *J. Appl. Phys.*, 95 (11), 2004
3. Process for the reduction of metallic compounds by polyols, and metallic powders obtained by this process, in accordance with U.S. Pat. No. 4,539,041.

These nanoparticles allow for close packing of the formed green body, and also enable initiation of the sintering process at a much lower temperature (e.g., approximately 400° C.) than for large Cobalt particles (GTP, Towanda, Pa., USA). For example, Co nanoparticles at sizes of approximately 20 nm or less combine with WC large particles, of approximately 2 microns result in a stable ink formulation. The stability is due, at least in part, due steric stabilization mechanism due to presence of the dispersant. It should be noted that other stabilization mechanism can be utilized, such as electrostatic, electrosteric, particles based stabilization and combination thereof. Additionally, a mixture of WC and Co particles of substantially the same size, for example, spherical and/or rounded particles of approximately 1 micrometer in diameter, are also stable, due to the lower melting point of Co (1495° C.) when compared to the melting point of WC (2870° C.) such that the Co particles sinter before the WC particles. Typical sintering temperatures for WC particle range from approximately 1430° C. to 1490° C. while pure Cobalt melts at 1495° C. During sintering, Co particles liquefy and easily dissolve Tungsten (W) and Carbon (C), which lowers the melting temperature. After solidification, the binder (Cobalt) still gets the face centered cubic (FCC) crystalline structure, but due to the high concentration of dissolved Tungsten (W), the natural phase transformation to hexagonal close packed (HCP) crystal structure is suppressed to some extent. A combination of HCP and FCC with stacking faults is the resulting structure. The Co grains are often dendritic and may grow to very large sizes, up to approximately 1 mm.

The present mixtures also account for the magnetic nature of the cobalt particles, by using spherical and/or rounded cobalt particles of approximately below 20 nanometers in diameter. This size minimizes the magnetic attractions between the cobalt particles. Further reduction of the magnetic attraction may occur when the aforementioned cobalt particles are of non-crystalline or in a suitable crystalline structure. Bulk cobalt exists in two allotropes, namely: (a) hexagonal close-packed Co (HCP-Co) and (b) face-centered cubic Co (FCC-Co).

Thermodynamically, HCP-Co is the stable phase below 450° C., while FCC-Co forms at higher temperatures. Accordingly, these phases are in equilibrium at approximately 422° C.-427° C. Because of the difference in crystal structure, variations in physical and magnetic properties between the two polymorphs arise. HCP-Co is slightly denser than FCC-Co, even though both phases are close-packed structures. Furthermore, HCP-Co is also magnetically harder than the FCC phase due to its magnetic anisotropy and high coercivity as compared to the symmetrical and low coercivity FCC phase. HCP-Co is the stable phase at room temperature; both phases can co-exist at ambient temperature in bulk samples. In the case of fine Co particles, recent works on the preparation of Co nanoparticles by low temperature solution chemistry have similarly produced mixtures of HCP and FCC-Co, with FCC as the predominant phase. It was found that FCC-Co has become more stable at ambient conditions when the particle size is reduced.

The Nano Co Particle Solution

The magnitude of the magnetic dipole P is proportional to the particle volume, i.e. to $P \sim r^{(3)}$, where r is the particle radius. The magnetic attraction force Fm between two dipoles P is proportional to $PxPxd^{(-4)}$, where d is the distance between the two dipoles (and x is the multiplication operation). Therefore, the energy associated with the two dipole interaction $Wm \sim PxPxr^{(-3)}$. For a given proportion of Cobalt in the dispersion, when the radii of the particle change, the distance d changes linearly with d, i.e. $d \sim r$. Therefore $Fm \sim P \, xPx^{(-4)} \sim r^6 x^{(-4)} = r^2$ and $W_m \sim PxPxd^{(-3)} \sim r^3$. The thermal energy associated with each of the degree of freedom is kT/2, including the three translational degrees of freedom (x, y, z) and three rotational degrees of freedom. This energy works to separate the particles from each other and to randomly rotate the magnetization direction. Thus, while energy that opposes agglomeration of the particles does not depend on r, energy per particle that encourages agglomeration decreases in proportion to $r^4$. As a consequence, for small enough r, the tendency of the Cobalt particles to agglomerate vanishes, which makes the dispersion stable. Accordingly, the smaller the size of the particles, the more stable dispersion of such particles due to the higher dominance of the Brownian motion in respect to the gravitational tendency of the particles precipitate. Qualitative experience showed that r<50 nm and, in particular, 20 nm is required for reducing the magnetic interaction between the particle below the insignificance level.

Carrier Vehicles

Carrier vehicles support the dispersions of the particles, e.g., the WC and Co particles detailed above. Exemplary carrier vehicles include solvents, such as organic solvents, water, and mixtures thereof. When the carrier vehicle is a solvent, the ink is referred to as solvent-based. When the carrier vehicle is water, the ink is referred to as water based.

The carrier vehicle may include one or more miscible liquids, enabling proper control of parameters, including, for example, evaporation rate, latency, viscosity and surface tension. The carrier vehicle is such that it evaporates quickly after printing so that the subsequent layer is deposited on a solid layer. To achieve this characteristic, the carrier vehicle has a boiling point at or below the temperature of the object surface during printing, while also allowing for proper performance of the print head.

Exemplary carrier vehicles include glycol ethers, and water soluble liquids such as ethylene glycol, propylene glycol. Glycol ethers such as propylene glycol or ethylene glycol series from Dow Chemical, Dimethoxyethane, also known as glyme, monoglyme, dimethyl glycol, ethylene glycol dimethyl ether, dimethyl cellosolve) series from Clariant and their mixtures could be used. In that manner, one can reach a wide range of boiling point for the carrier vehicle (from 100° C. up to 320° C.).

When present in the ink, the carrier vehicles may be from approximately 40 to approximately 60 weight percent of the ink (ink composition).

The ink composition of WC and Co particles in the liquid carrier vehicle may include additives. The additives are presented as follows, with any one or more of these additives, e.g., dispersing agents, wetting and leveling agents, rheological agents, and binders, being permissible in an ink.

Dispersing Agents

Dispersing agents, such as a surfactants and polymers, may be used as stabilizers to stabilize the ink. The dispersing agent should be of a composition, which has affinity to the WC and/or Co particle surface, and prevents the aggregation of the dispersed WC and/or Co particles, by a steric, electrostatic or electrosteric stabilization mechanism.

The dispersing agent is molecularly compatible with the carrier vehicle, for stability purposes. In water based inks, the stabilization can be achieved by proper control of the surface properties, such as by changing the pH of the dispersion. It should be noted that the stabilizer may be bound to the particles' surface by covalent bonds or by physical adsorption. The dispersing agent should also be such that it may be removed from the printed object prior to any desired post processing stage, and specifically before heat treatments to the printer object, such as sintering. By removing the dispersing agent, sintering between WC and Co particles can proceed without interference or contamination by particles of the dispersing agent. Additionally, with the dispersing agent removed, the formation of "islands" of dispersing agent particles within the printed object, which will weaken the resulting solidified 3D structure, is prevented. Polymeric dispersants and other non-volatile compounds are typically burned or fired off, during post printing process.

Exemplary dispersing agents include: DISPERBYK® 180, DISPERBYK® 190, DISPERBYK® 163 from Byk Chemie. SOLSPERSE® 39000, SOLSPERSE® 33000, SOLSPERSE® 35000 from Lubrizol. RHEOSPERSE® 3020, 3450, 3620 from Coatex (Arkema), EFKA® 7701, EFKA® 7731, EFKA® 7732 from BASF.

When present in the ink, dispersing agents may be from approximately 1 to approximately 10 weight percent of the ink, depending on the resulting ink properties, such as viscosity.

Wetting and Leveling Agents

These are usually surface active molecules that enable control of the surface tension of the ink to: 1) enable proper jetting (expulsion) of the ink from the ink jet print head, 2) enable proper wetting of the ink droplet upon contact with the substrate, and, 3) to enable control of the flow of deposited materials and the morphology of the resulting printed pattern, by preventing or inducing surface tension gradients.

Exemplary wetting and leveling agents include BYK® 333, BYK® 307 from Byk Chemie, TEGO® Wet 270, TEGO® Wet 280, TEGO® Wet KL245 from Evonik.

When present in the ink, the wetting and leveling agents may be from approximately 0.01 to approximately 5 weight percent of the ink.

Rheological Agents

These are molecules that enable control of the rheological properties of the ink, which affect the stability of ink during storage (mainly sedimentation rate), the jetting (expulsion) performance, and the flow of ink after being deposited. It should be noted that the ink may be a Newtonian liquid or pseudoplastic liquid. The later may, for example, enable minimizing particles sedimentation during storage (high viscosity at low shear rate), and reduce the flow of ink after being printed (for better printing resolution). Rheological agents include, for example, cellulosic polymers such as ethyl cellulose, carboxymethyl cellulose, hydroxypropyl methyl cellulose, cellulose acetate. These rheological agents may also serve as binders, in accordance with the binders detailed below.

When present in the ink, they may be from approximately 0.01 to approximately 10 weight percent of the ink.

Binders

The binder (binding agent) serves to promote binding of the WC and Co particles after the printing is terminated, for example, in post-printing processes such as sintering. The binders, when in the post-printed and unsinterd object or "green body" assist the object in maintaining its physical shape prior to heat treatment processes, such as sintering. The binder may include various materials, such as organic polymers or surfactants. Additionally, the above discussed dispersing agent can also serve as a binder.

When present in the ink, the binders may be from approximately 0.1 to approximately 30 weight percent of the ink.

The above-disclosed inks are used in 3D printers, which are formed of components including, a print head, e.g., a Diamatics Sapphire QS-256 print head from Konica Minolta, an ink delivery system from the ink cartridge/bottle to the print head, an x-y scanning system, a substrate holder, a motorized substrate stage that keeps the distance between the printed layer and the print head constant, a leveling device and, a heating system (optional). Exemplary printing systems suitable for use with the above-disclosed inks is described in commonly owned and related U.S. Patent Application, entitled: Methods and Systems for Printing 3D Object by Inkjet, U.S. application Ser. No. 15/029,815, referenced above.

An example of dispensing engine comprises one or more inkjet heads one after the other in X (scan) direction, each comprising an inkjet array of nozzles, including nozzles of 30μ (μ=micrometer or micron) diameter, wherein the nozzle arrays are aligned along Y (cross scan) direction.

In order to avoid nozzle clogging and to assure proper jetting power and direction, the particle should be smaller than roughly 1/20 of the nozzle diameter. Hence, in this example, the particle size should preferably be equal or smaller than 1.5 μm.

The dispensing heads with the ink therein are maintained at a temperature between 20° C. and 60° C., and scan above the object in close vicinity (e.g. 1.5 mm above the object surface. Since the object is maintained at high temperature, which is comparable to the boiling point of the liquid carrier (e.g. 200° C.), a thermal buffer is required for protecting the heads from the object high temperature. A radiation heating device will further heat up the newly dispensed layer, assisting thereby to evaporate the liquid carrier. A dispensing engine comprises one or more inkjet heads protected by a "mask" (i.e. thermal buffer) is specified in commonly owned and related patent application entitled: Methods and Systems for Printing 3D Object by Inkjet, U.S. application Ser. No. 15/029,815 referenced above. The cooling mask is maintained at a relatively low temperature compared to the temperature of the object while being printed (e.g. from 10 to 40° C.).

Post Print Processing

It should be noted that in order to obtain a 3D WC-Co object with proper mechanical properties, all the additional materials, for example, organic materials, should be removed from that body during printing and or before high temperature treatments including sintering stage. This can be achieved by various means, such as burning or decomposition to dissolve the dispersants prior to evaporation. In the context of this document, the terms "burn out" or "burn off" or "fire off" refer to evaporating or disintegrating/decomposition followed by evaporating a component of the ink.

After completion of printing, the object is typically placed in an oven where the object is fired to the required temperature until complete sintering occurs. This final (complete) sintering stage can include the following steps: 1) initial warming to burn out all organic material; 2) further warming to liquidize inorganic additives, including the Cobalt particles; and, 3) a final warming to sinter the particles, e.g., the WC particles, in the liquid phase.

Figure 4:
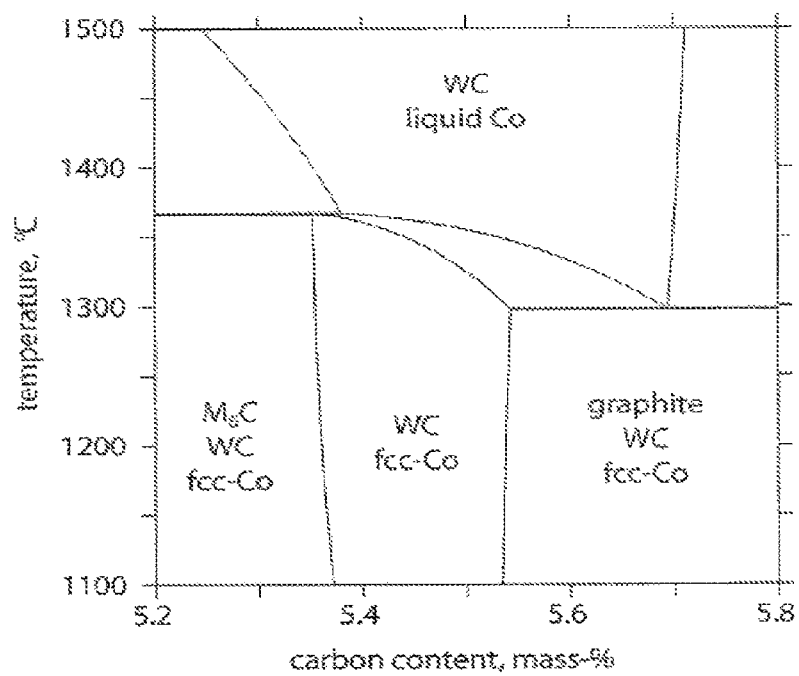
FIG. 4 is a vertical section of the phase diagram for Co—W—C system at 10 wt % Co. FCC (Face Centered Cubic)-Co is faced centered cubic crystalline phase, and, FIG. 5 is a diagram of a sintering temperature profile for WC/Co printed part.

Part of the firing steps can include applying vacuum, applying pressure, adding inert gas to prevent oxidation, and adding other gases that may add desired molecular diffusion or chemical reaction with the body. FIG. 4 describes phase diagram of WC/Co at a 90:10 weight ratio. Here, the cobalt particles have melted to serve as a binder for sintering of the WC particles, that occurs at approximately 1400° C., and for example, is in accordance with, "WC Grain Growth During Sintering of Cemented Carbides," Mannesson K., Doctoral Thesis, KTH, Stockholm, Sweden 2011.

FIG. 4 shows a calculated vertical section through the Co-WC system at 10 wt % Co. If only WC and Co are desired in the final object, the content is limited to the carbon range 5.38-5.54 wt % as shown by the two-phase region (WC+FCC Co). During sintering some carbon reacts with oxygen present and the final carbon content should be adjusted during the process to balance the carbon loss and to obtain the desired composition of the final product. During liquid-phase sintering the microstructure coarsens simultaneously with the densification process. The small grains dissolve and reprecipitate as the larger grains. The mean grain size will thus increase with increasing sintering time.

Tungsten Carbide (WC) and Cobalt (Co) powder has been milled during ink formulation and powder dispersion. Accordingly, agglomerates are broken and the particles obtain an irregular shape that is slightly rounded, which makes sintering easier. Milling also provides a more even distribution of the cobalt (Co) and tungsten carbide (WC) particles and makes the surfaces more reactive, promoting the wetting of cobalt (Co) on the carbide (C) surfaces. The tungsten carbide (WC) has an anisotropic surface energy due to its hexagonal crystal structure and therefore easily forms prismatic grains during sintering. From Figures (FIGS.) 1A, 1B, 2 and 3, the particles of WC and Co have more rounded shapes directly after milling and that the facets are formed during sintering. The carbon content also influences the shape of the WC grains. In a Carbide (C)-rich alloy, the grains are more faceted and triangular prisms with sharp corners may occur.

Figure 1B:
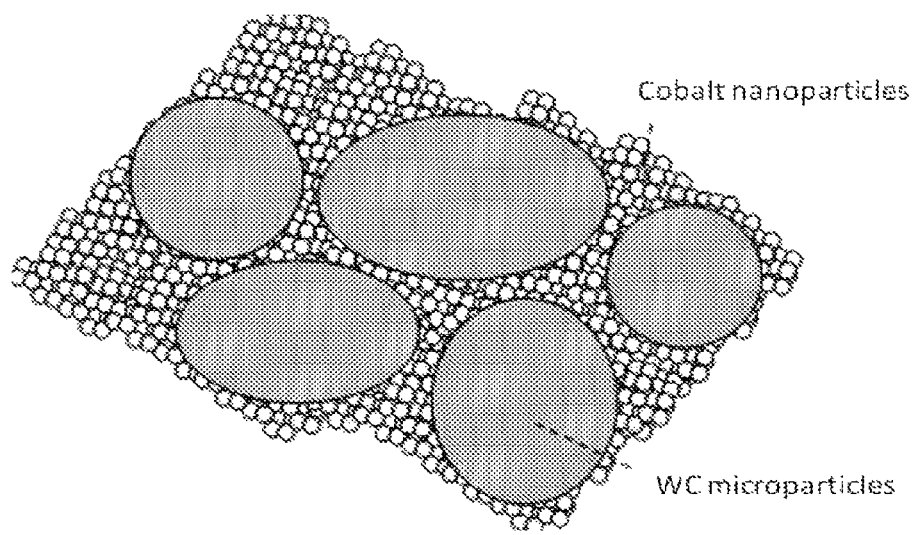
FIG. 1B is a diagram of an exemplary dispersion of tungsten carbide (WC) particles in an ink in accordance with the embodiment of FIG. 1A.
Figure 2:
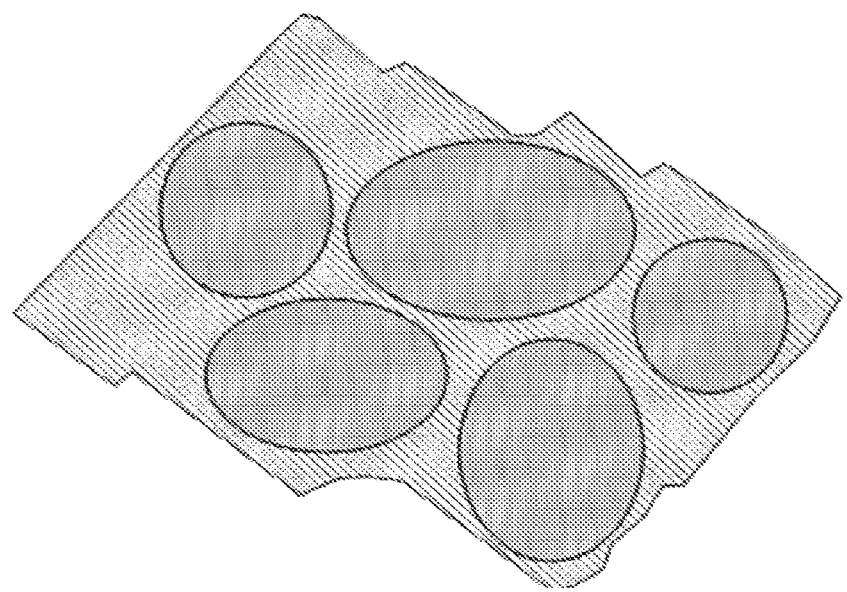
FIG. 2 is a schematic representation of Tungsten Carbide/ Cobalt (WC/Co) particles dispersion during post printing treatment at temperature where Cobalt (Co) melts and before Tungsten Carbide (WC) particles have sintered.
Figure 3:
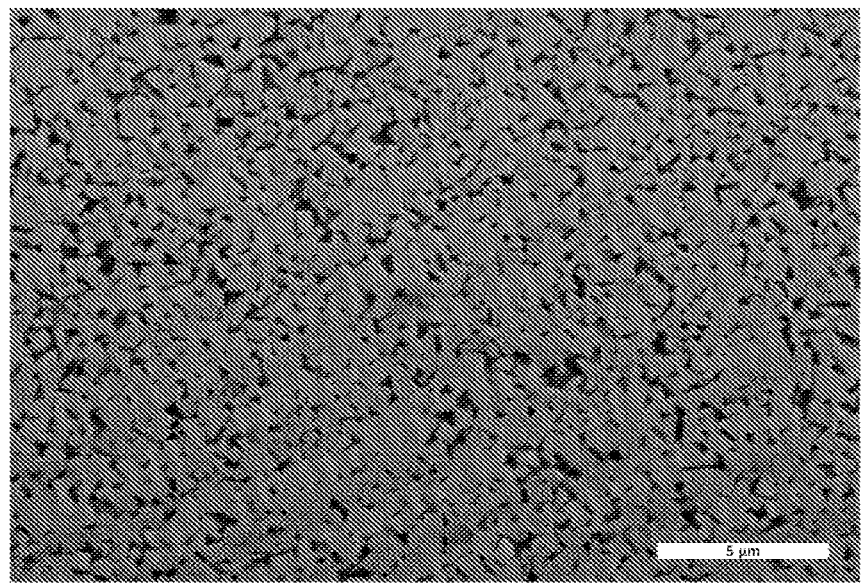
FIG. 3 is a photomicrograph of printed WC/Co ink after the Tungsten Carbide particles have been sintered.
Figure 5:
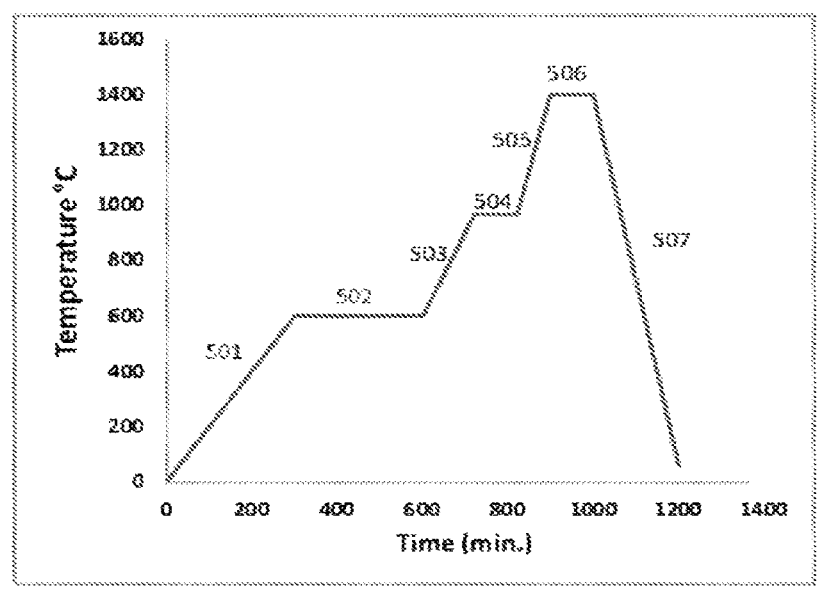

Attention is directed to FIG. 5, which shows a diagram of a sintering profile for WC/Co green body. The first lines 501 and 502 show a temperature increase up to approximately 600° C. and keeping it at this temperature for 10 hours are necessary to burnout of all organic matter present in the green part (see also FIGS. 1A and 1B for result description). Supplementary heating, shown by line 503 and 504, to 950-980° C. as shown schematically in FIG. 2. This permits liquefaction of Cobalt (melting) that is penetrating the WC matrix that can start to sinter at a higher temperature (approximately 1400° C.), as shown by line 505 and 506. Then, rapid cooling, as shown by line 507, freezes the geometry of the final products (FIG. 3) and its mechanical properties.

Products which may be made by the aforementioned process include cutting tools. The following Examples present formulations for inks and their preparations.

EXAMPLE-1: Ink formulation composed of WC and Co particles is prepared by mixing a dispersion of WC particles in liquid carrier, with a dispersion of cobalt particles smaller than 100 nm.

| Metal (gr) | Material Weight (gr) | Materials |
|---|---|---|
| 160.0 | 290.00 | WC dispersion |
| 19.0 | 35.0 | Co dispersion (No 1) |
| 0.00 | 0.7 | Cellulosic polymer (a rheologic additive and also a binder) |
|  | 35.0 | Glycol ether (Carrier Vehicle-loading adjustment) |
| 179.0 | 360.7 | Total Formulation |
| Ink property | | |
| 15.0 ± 5.0 | | Viscosity (cPs), 25° C. |
| 29.0 ± 2.0 | | Surface tension, 25° C. |

WC Dispersion—WC dispersion was prepared by dispersing 55±2 wt % WC powder (0.8 micron) in glycol ethers and stabilized with a polymeric dispersant (5 wt % on WC particles). All components were mixed in a vertical agitator (vertical agitator mill) filled with 0.5 mm WC beads and a volume ratio of 67/33 (beads/product; vol/vol) for 6 hours at 15° C. The WC dispersion is stabilized with a polymeric dispersant, which serves as a dispersing agent. The dispersing agent includes one or more of DISPERBYK® 180, DISPERBYK® 190, DISPERBYK® 163 from Byk Chemie of Germany, SOLSPERSE® 39000, SOLSPERSE® 33000, SOLSPERSE® 35000 from Lubrizol of the UK, RHEOSPERSE® 3020, 3450, 3620 from Coatex (Arkema, France), EFKA® 7701, EFKA® 7731, EFKA® 7732 from BASF of Germany.

Co Dispersion—Co dispersion was prepared by dispersing 60 wt % Co powder (70 nm, American Elements, USA) in glycol ethers and stabilized with a polymeric dispersant (5 wt % on Co particles). All components were mixed in a vertical agitator filled with 0.4 mm ZrO2 beads and a volume ratio of 67/33 (beads/product; vol/vol) for 12 hours at 15° C. The Co dispersion is stabilized with a polymeric dispersant, which serves as a dispersing agent. The dispersing agent includes one or more of DISPERBYK® 180, DISPERBYK® 190, DISPERBYK® 163 from Byk Chemie, SOLSPERSE® 39000, SOLSPERSE® 33000, SOLSPERSE® 35000 from Lubrizol, RHEOSPERSE® 3020, 3450, 3620 from Coatex (Arkema), EFKA® 7701, EFKA® 7731, EFKA® 7732 from BASF.

Rheologic Agent/Binders—Cellulosic polymers examples: ethyl cellulose, carboxymethyl cellulose, hydroxypropyl methyl cellulose, cellulose acetate.

Carrier Vehicles—Glycol ethers examples: all propylene glycol or ethylene glycol series from Dow Chemical, Midland Mich., USA, all glymes series (Dimethoxyethane, also known as glyme, monoglyme, dimethyl glycol, ethylene glycol dimethyl ether, dimethyl cellosolve) from Clariant and their mixtures.

EXAMPLE-2: Ink formulation composed of WC and Co particles are prepared by mixing a dispersion of WC particles in liquid carrier, with a dispersion of cobalt particles smaller than 20 nm.

| Metal (gr) | Material Weight (gr) | Materials |
|---|---|---|
| 160.0 | 290.00 | WC dispersion |
| 19.0 | 35.0 | Co dispersion (No 2) |
| 0.00 | 0.1 | Cellulosic polymer (a rheologic additive and also a binder) |
| | 35.0 | Glycol ether (Carrier Vehicle-loading adjustment) |
| 179.0 | 360.1 | Total Formulation |
| | Ink property | |
| | 15.0 ± 5.0 | Viscosity (cPs), 25° C. |
| | 29.0 ± 2.0 | Surface tension, 25° C. |

WC Dispersion—Same as in Example 1 above
Rheologic Agent/Binders—Same as in Example 1 above
Carrier Vehicle—Same as in Example 1 above
Co Dispersion—Co dispersion prepared by chemical reduction in an organic liquid. The chemical reduction may be performed for example by reducing Co acetate tetrahydrate in polyol/oleic acid mixture under Argon atmosphere. In a typical synthesis of Co nanoparticles, 5 grams of cobalt acetate tetrahydrate, Co(CH3CO2h-4 H2O, and 0.8 gram of NaOH were mixed and stirred in 100 mL of deoxygenated tetraethylene glycol in a 250 mL round-bottomed flask under an Argon (Ar) atmosphere. The solution was heated to 200° C. at a rate of 10° C./min. At this temperature, 6 grams of oleic acid was added to the solution. The mixture was heated to 314° C. at a rate of 5° C./min and refluxed for 6 hours. After the reaction, the solution was cooled to room temperature, and precipitated with ethanol/acetone (1/1; wt/wt). The precipitate was washed repeatedly with excess ethanol and dried with nitrogen gas.

EXAMPLE-3: Ink formulation composed of WC and Co precursor is prepared by mixing a dispersion of WC particles in liquid carrier, with an organo cobalt compound.

| Metal (gr) | Material Weight (gr) | Materials |
|---|---|---|
| 30.0 | 80.0 | WC dispersion |
| 3.4 | 56.7 | Co precursor (organo cobalt compound) |
| | 0.2 | Cellulosic polymer (a rheologic additive and also a binder) |
| | 1.3 | Glycol ether (Carrier Vehicle-loading adjustment) |
| 33.4 | 138.2 | Total Formulation |
| | Ink property | |
| | 15.0 ± 5.0 | Viscosity (cPs), 25° C. |
| | 29.0 ± 2.0 | Surface tension, 25° C. |

WC Dispersion—Same as in Example 1 above
Rheologic Agent/Binders—Same as in Example 1 above
Carrier Vehicle—Same as in Example 1 above
Co Precursor/Dispersion—Organo cobalt compound could be taken from the following non limiting list: Dicobalt octacarbonyl, Cyclopentadienylcobalt dicarbonyl, Dicarbonylcyclopentadienyl cobalt, Pentamethylcyclopentadienyl) cobalt(I) dicarbonyl, Cobalt tetracarbonyl (Sigma, USA).

In some examples, a low molecular surfactant may be added to the organo cobalt compound solution to control the size the new formed Co nanoparticles. Suitable surfactants include: lauryl acid, oleic acid, lauryl amine, oleylamine at a concentration of 5-10 wt % based on Co content. During high temperature post printing treatment, the precursor will be converted into nanometric cobalt nanoparticles in situ, thus overcoming the need to stabilize a dispersion of Co nanoparticles and thus the use of dispersant (Synthesis and magnetic properties of E-cobalt nanoparticles, *Surf Interface Anal.*, 2004; 36: 155-160).

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

When expressing amounts, ranges and sizes, dimensions and other measurable quantities the words "approximately" and "about" are used interchangeably.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. An ink composition for printing a three-dimensional object, the ink composition comprising:
    a carrier vehicle, tungsten carbide particles, at least one dispersing agent, at least one binder, and cobalt particles;
    wherein the carrier vehicle includes at least one glycol ether,
    wherein the cobalt particles include at least one of cobalt or organo cobalt compound,
    wherein the weight ratio of tungsten carbide particles to cobalt particles is between about 8:2 and about 9.5:0.5, and
    wherein the ink composition has a viscosity between about 10 cP to about 30 cP.

2. The ink composition of claim 1, wherein a combined weight of the tungsten carbide and cobalt particles is between about 40% to about 60% of a weight of the ink composition.

3. The ink composition of claim 1, wherein the carrier vehicle includes dimethoxyethane.

4. The ink composition of claim 1, wherein the carrier vehicle includes at least one water soluble liquid selected from a group including ethylene glycol and propylene glycol.

5. The ink composition of claim 1, wherein the at least one dispersing agent serves as a stabilizer, the at least one dispersing agent selected from a group including DISPERBYK® 180, DISPERBYK® 190, DISPERBYK® 163, SOLSPERSE® 39000, SOLSPERSE® 33000, SOLSPERSE® 35000, RHEOSPERSE® 3020, RHEOSPERSE® 3450, RHEOSPERSE® 3620, EFKA® 7701, EFKA® 7731, and EFKA® 7732.

6. The ink composition of claim 1, further including at least one surface agent that affects a surface tension of the ink composition, the at least one surface agent selected from a group including BYK® 333, BYK® 307, TEGO® Wet 270, TEGO® Wet 280, and TEGO® Wet KL245.

7. The ink composition of claim 1, further including at least one rheological agent that affects rheological properties of the ink composition, the at least one rheological agent selected from a group including ethyl cellulose, carboxymethyl cellulose, hydroxypropyl methyl cellulose, and cellulose acetate.

8. The ink composition of claim 1, wherein the cobalt particles are of diameter sizes to inhibit magnetic attractions with other cobalt particles.

9. The ink composition of claim 8, wherein a grain size of the tungsten carbide particles is about 2 microns or less, and a grain size of the cobalt particles is about 1 micron or less.

10. The ink composition of claim 8, further comprising a rheological agent, wherein the binder is selected from a group consisting of organic polymers, surfactants, and the rheological agent, and the binder is from 0.1 to 30 wt % of the ink composition.

11. The ink composition of claim 1, wherein a grain size of the tungsten carbide particles is about 2 microns or less, and a grain size of the cobalt particles is about 1 micron or less.

12. The ink composition of claim 1, further comprising a rheological agent, wherein the binder is selected from a group consisting of organic polymers, surfactants, and the rheological agent, and the binder is from 0.1 to 30 wt % of the ink composition.

13. An ink composition for printing a three-dimensional object, the ink composition comprising:
    a carrier vehicle, tungsten carbide particles, at least one dispersing agent, at least one binder, and cobalt particles;
    wherein the carrier vehicle includes at least one glycol ether,
    wherein the cobalt particles include at least one of cobalt or organo cobalt compound,
    wherein the ink composition has a viscosity between about 10 cP to about 30 cP.

14. The ink composition of claim 13, wherein the at least one dispersing agent is selected from a group including DISPERBYK® 180, DISPERBYK® 190, DISPERBYK® 163, SOLSPERSE® 39000, SOLSPERSE® 33000, SOLSPERSE® 35000, RHEOSPERSE® 3020, RHEOSPERSE® 3450, RHEOSPERSE® 3620, EFKA® 7701, EFKA® 7731, and EFKA® 7732.

15. The ink composition of claim 13, further including at least one surface agent selected from a group including BYK® 333, BYK® 307, TEGO Wet 270, TEGO Wet 280, and TEGO Wet KL245.

16. The ink composition of claim 13, further including at least one rheological agent selected from a group including ethyl cellulose, carboxymethyl cellulose, hydroxypropyl methyl cellulose, and cellulose acetate.

17. An ink composition comprising:
    a carrier vehicle, tungsten carbide particles, at least one dispersing agent, at least one binder, and cobalt particles, at least one surface agent, and at least one rheological agent;
    wherein the carrier vehicle includes at least one glycol ether,
    wherein the cobalt particles include at least one of cobalt or organo cobalt compound,
    wherein the weight ratio of tungsten carbide particles to cobalt particles is between about 8:2 and about 9.5:0.5, and
    wherein the ink composition has a viscosity between about 10 cP to about 30 cP.

* * * * *